UNITED STATES PATENT OFFICE.

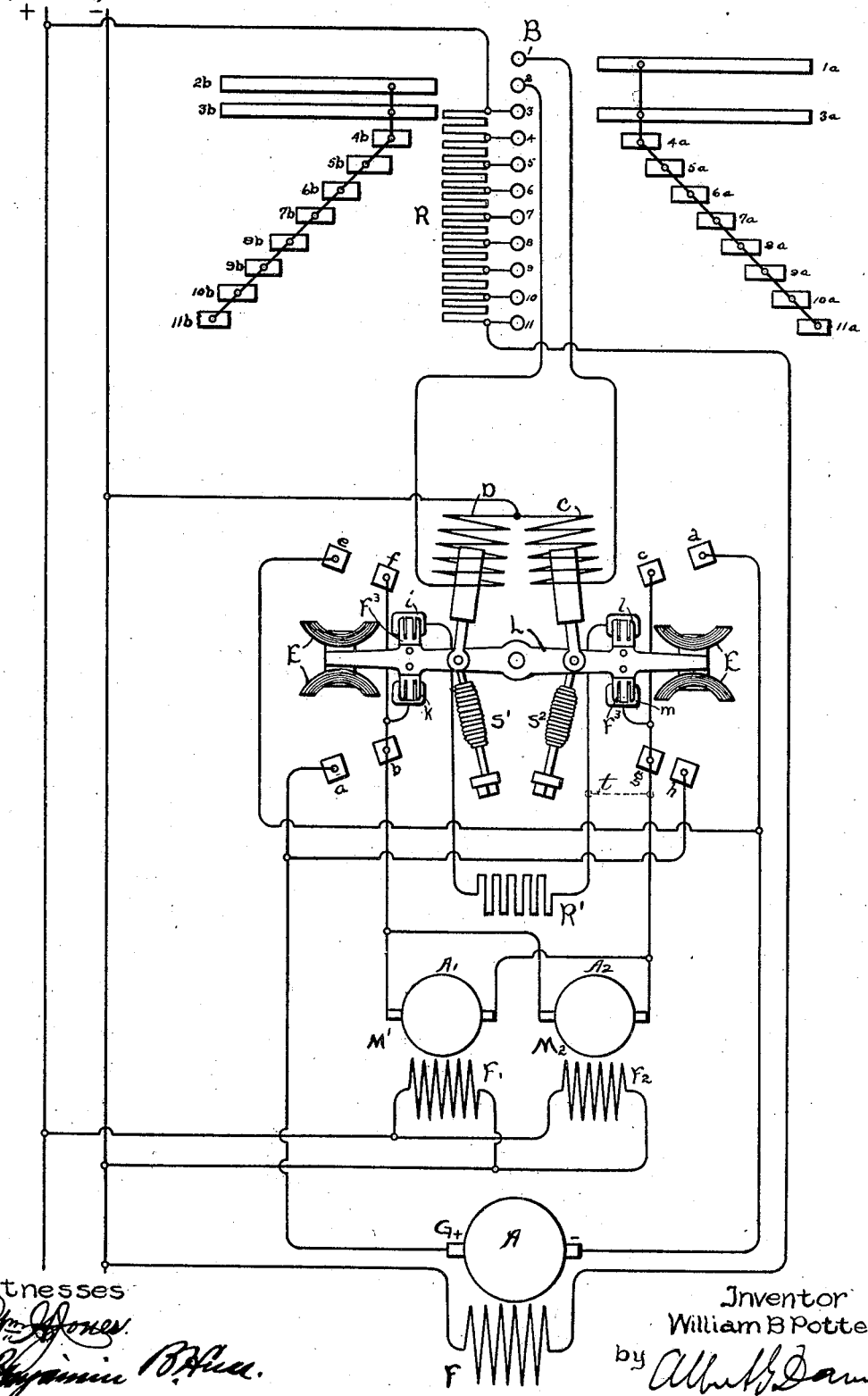

WILLIAM B. POTTER, OF SCHENECTADY, NEW YORK, ASSIGNOR TO THE GENERAL ELECTRIC COMPANY, OF NEW YORK.

SYSTEM OF MOTOR CONTROL.

SPECIFICATION forming part of Letters Patent No. 678,029, dated July 9, 1901.

Application filed March 29, 1900. Serial No. 10,592. (No model.)

*To all whom it may concern:*

Be it known that I, WILLIAM B. POTTER, a citizen of the United States, residing at Schenectady, county of Schenectady, State of New York, have invented certain new and useful Improvements in Systems of Motor Control, (Case No. 1,105,) of which the following is a specification.

My present invention relates to a system of motor control, and although useful in various relations it is particularly adapted for use on war-ships to actuate the gun-turrets.

In such systems as applied to turret control it is at present customary to rotate each turret by means of one or more motors supplied with current from a special generator and to control the voltage of the generator and make the necessary motor connections by a special switch or controller placed in the turret and in charge of a special operator.

It is obviously inadvisable to supply current from the generator to the motors through the controlling-switch which is located in the turret, both because the handling of large currents in the turret is a source of danger and because the controlling-switch and the conductors leading thereto must then be capable of carrying the heavy currents required to operate the motors. In order to avoid the difficulties above referred to, a system has been devised in which there are provided a plurality of main controlling-switches located at any desired point outside of the turret and controlled in their operation by means of one or more special switches or controllers located within the turret. This system forms the subject of Patent No. 644,666, granted March 6, 1900, to Maxwell W. Day, and, as shown in the drawing of said patent, comprises three pairs of electromagnetically-actuated switches, two of said pairs being made up of circuit-changing switches operating to connect the motors for rotation in one direction or the other, and the third pair constituting short-circuiting switches for short-circuiting the armatures of the motors through a suitable resistance for braking. These switches are controlled in operation by means of a special switch located in the turret, and this latter switch is combined with a switch or controller for controlling the field excitation of the main generator.

It is one of the objects of my present invention to simplify the system above referred to, and to this end I have provided an arrangement such that the several motor-switches may be operated by means of a single pair of electromagnets.

Another feature of my invention consists in so arranging the short-circuiting switches that they are maintained normally in a closed position without any expenditure of energy and are actuated to open the short circuit only when it is desired to supply power to the motors.

In the drawing annexed to this specification, G is the main generator, here shown as a shunt-wound machine, having its field-winding F supplied with current from the plus and minus mains through a resistance R. The plus and minus mains may be the mains of the main lighting system on the ship. It is understood that the generator G should have while the ship is in action no other office than to supply with current the motor or motors operating the turret. The resistance R is regulated by the special switch or controller B, located in the turret. This controller, in so far as it operates to regulate the resistance R, comprises fixed contacts 3 to 11 and movable contacts $4^a$ to $11^a$ and $4^b$ to $11^b$, the said contacts being shown developed on a plane surface, as is customary in illustrating such a structure, although in actual construction the movable contacts are mounted on the surface of the cylinder and are successively brought into contact with the fixed contacts or brushes as the cylinder is rotated.

$M'$ $M^2$ represent the motors by means of which the turret is to be operated. The field-windings $F'$ $F^2$ of these motors are connected permanently in multiple across the plus and minus mains. The armatures $A'$ $A^2$ are also connected in multiple to each other, and connections are made from the armature-terminals to contacts on the several main controlling-switches. These main controlling-switches comprise fixed contacts $a\ b$, $c\ d$, $e\ f$, $g\ h$, $i\ k$, and $l\ m$ and movable contacts E and $F^3$, coöperating therewith. The movable contacts are mounted upon a common switch-lever L, normally held in the position shown in the drawing by means of the springs $s'\ s^2$ and actuated one way or the other by means of the electromagnets C and D. With the switch-lever in the position shown in the drawing the brushes $F^3$ rest upon the contacts $i\ k$ and $l\ m$, thus short-circuiting the armatures of the motors $M'$ and $M^2$ through the resistance $R'$, this resistance being so chosen that when the two motors are driven as generators by the load to which they are connected sufficient current will flow to bring the motors immediately to rest, but not sufficient to overheat or endanger them. The controller B, in addition to the resistance-controlling contacts, comprises also fixed contacts 1 and 2, which coöperate with the movable contacts $1^a$ or $2^b$, according as the controller is moved in one direction or in the other. These fixed brushes, in connection with the corresponding movable contacts, control the supply of current to the windings of the electromagnets C and D.

By mounting the movable elements of all the main controlling-switches so that they may be simultaneously operated I am enabled to reduce the number of actuating devices required to operate said switches, and by providing means for maintaining the short-circuiting switches normally closed I insure that the short circuit will be applied and the motors brought to rest whenever the circuit of the actuating-electromagnet is broken and whether or not the circuit connections to the switch-actuating devices are in working condition. This latter feature is of very considerable importance in controlling heavy loads, since the short-circuiting means is automatic in its action and entirely independent of any circuit connections, so that even if the system should become deranged by the breaking of any of the circuits of the actuating-electromagnets the motors will still be immediately brought to rest as soon as the actuating devices of the circuit-changing switches are released.

It is evident that it is not necessary that there should be two short-circuiting switches, and since under ordinary conditions a single short-circuiting switch would be sufficient I have shown by a dotted line at $t$ the change in circuit connections that would be required if the switch having the two contacts $l$ and $m$ were omitted. If a single short-circuiting switch is used, it would ordinarily be so located that its moving parts would be symmetrical with the mounting of the lever L, so that the lever would be balanced; but the particular position of the short-circuiting switch on the lever is evidently a matter involving mechanical skill only.

The operation of the system illustrated is as follows: Assuming the parts to be in the position shown in the drawing, if it is desired to start the motors $M'$ and $M^2$ in, say, left-hand rotation the controller B will be moved to the left until the movable contacts $1^a$ and $3^a$ engage with the corresponding fixed contacts 1 and 3. A circuit will then be closed from the positive main through the fixed contact 3 and the cross-connected movable contacts to the fixed contact 1, electromagnet C, and back to the negative main. The electromagnet C will therefore be energized and the lever L moved into position to close the circuit to the motors at the contacts $a\ b$ and $c\ d$, the short circuit being removed by the passing of the brushes $F^3$ off from the contacts $i\ k$ and $l\ m$. With the switch-lever in this position current will flow from the armature of the generator G to the fixed contact $a$ of the lower left-hand circuit-changing switch through the coöperating brush E to the contact $b$ and thence through the two motor-armatures in multiple to the fixed contact $c$ of the upper right-hand circuit-changing switch through the brush E of said switch to the fixed contact $d$ and thence back to the other side of the generator-armature. The motors $M'\ M^2$ will start in operation, but will revolve at a low speed, for the reason that only a low potential will be generated by the armature of the generator G. If now the controller D is moved still farther to the left, the sections of the resistance R will be gradually cut out as the movable contacts $4^a$ to $11^a$, inclusive, come into engagement with their corresponding fixed contacts, and the potential of the generator G will be gradually increased until finally when the switch B is in its full-on position to the left the potential of the generator G will be at a maximum and the motors $M'\ M^2$ operating at full speed. If now it is desired to stop the motors, the controller B is moved back, gradually inserting the resistance R and reducing the potential of the generator G, until finally when all the resistance R has been included in circuit with the field-magnet of the generator the contact $1^a$ leaves the fixed contact 1, the electromagnet C is deenergized, and the lever L returned to the position shown in the drawing, in which position it is maintained by means of the springs $s'\ s^2$. When the lever L reaches this position and the brushes $F^3$ bridge the contacts $i\ k$ and $l\ m$, the motors $M'$ and $M^2$, operating as generators driven by their load, will supply current through a short circuit containing the resistance $R'$, which resistance is, as already stated, so chosen that it permits the flow of sufficient current to bring the motors immediately to rest, but prevents an excessive current-flow, which would endanger the motors. If after the load has come to rest it is desired to operate the motors in the opposite direction, the controller B will be moved to the right until the movable contacts $2^b$ and $3^b$ engage with corresponding fixed contacts 2 and 3. A circuit will then be closed from the positive main through the fixed contact 3 and cross-connected movable contacts to the fixed contact 2, electromagnet D, and back to the negative main. The electromagnet D will therefore be energized and the lever L moved into position to close the circuit to the motors at the contacts $e\ f$ and $g\ h$, the short circuit being removed, as before, by the passing of the brushes F³ off the contacts $ik$ and $lm$. With the switch-lever in this position current will flow from the armature of the generator to the fixed contact $h$ of the lower right-hand circuit-changing switch through the coöperating brush E to the contact $g$ and thence through the two motor-armatures in multiple in a direction opposite to the direction of current-flow when the circuit-changing switches $ab$ and $cd$ were in operation to the fixed contact $f$ of the upper left-hand circuit-changing switch and through the brush E of said switch to the fixed contact $e$ and thence back to the other side of the generator-armature. As the controller B is moved farther to the right the sections of the resistance R will be gradually cut out as the movable contacts $4^b$ to $11^b$ engage the corresponding fixed contacts 4 to 11, and the potential of the generator G will be gradually increased, as before, until finally when the controller B is in its full-on position to the right the potential of the generator G will be at a maximum and the motors $M'$ $M^2$ operating at full speed in right-handed rotation.

While I have described my invention as particularly applicable to the operation of turrets on a ship and while it is particularly adapted for such use, it is evident that it is not limited thereto, but is equally advantageous in any position where it is desired to control from a distant point the operation of a moving load, and while I have shown only a single controller B it is evident that any desired number of such controllers might be connected in multiple, it being preferable in such case to provide suitable locking means for preventing the operation of all of the other controllers after any one has been started into operation. Moreover, although I have shown the movable members of all the main controlling-switches mounted on a single lever it is evident that I am not limited to this specific construction, but am entitled to cover any modifications which embody the essential features of my invention.

What I claim as new, and desire to secure by Letters Patent of the United States, is—

1. In combination, a source of supply, a motor or motors, normally open switches, between said source and said motor, arranged to supply current to the motor-armature in either direction, a switch or switches normally closed and arranged to short-circuit the motor-armature through a suitable resistance, and electromagnetic means for closing the normally open switches and opening the short-circuiting switch or switches.

2. In combination, a source of supply, a motor or motors, normally open switches, between said source and said motor, arranged to supply current to the motor-armature in either direction, a switch or switches normally closed and arranged to short-circuit the motor-armature through a suitable resistance, electromagnetic means for closing the normally open switches and opening the short-circuiting switch or switches, and means located at a distant point for controlling the operation of said electromagnetic means.

3. In combination, a source of supply, a motor or motors, normally open switches, between said source and said motor, arranged to supply current to the motor-armature in either direction, a switch or switches normally closed and arranged to short-circuit the motor-armature through a suitable resistance, electromagnetic operating means for closing the normally open switches and opening the short-circuiting switch or switches, and means located at a distant point for controlling said operating means and for controlling the potential of said source of supply.

4. In combination, a source of supply, a motor or motors, circuit-changing switches, between said source and said motor, arranged to supply current to the motor-armature in either direction, a switch or switches connected to short-circuit the motor-armature through a suitable resistance, means for maintaining the circuit-changing switches normally open and the short-circuiting switch or switches normally closed, and electromagnetic means for closing the circuit-changing switches and opening the short-circuiting switch or switches.

5. In combination, a source of supply, a motor or motors, circuit-changing switches, between said source and said motor, arranged to supply current to the motor-armature in either direction, a switch or switches connected to short-circuit the motor-armature through a suitable resistance, means for maintaining the circuit-changing switches normally open and the short-circuiting switch or switches normally closed, electromagnetic means for closing the circuit-changing switches and opening the short-circuiting switch or switches, and means located at a distant point for controlling the operation of said electromagnectic means.

6. In combination, a source of supply, a motor or motors, circuit-changing switches, between said source and said motor, arranged to supply current to the motor-armature in either direction, a switch or switches connected to short-circuit the motor-armature through a suitable resistance, a lever carrying the movable members of all of said switches, means tending to maintain said lever in such a position that the short-circuiting switch or switches will be closed and the circuit-changing switches opened, and means for operating said lever to close the circuit-changing switches.

7. In combination, a source of supply, a motor or motors, circuit-changing switches, between said source and said motor, arranged to supply current to the motor-armature in either direction, a switch or switches connected to short-circuit the motor-armature through a suitable resistance, a lever carrying the movable members of all of said switches, means tending to maintain said lever in such a position that the short-circuiting switch or switches will be closed and the circuit-changing switches opened, electromagnetic means for operating said lever, and a switch for controlling the operation of said electromagnetic means.

It witness whereof I have hereunto set my hand this 27th day of March, 1900.

WILLIAM B. POTTER.

Witnesses:
BENJAMIN B. HULL,
ALEX. F. MACDONALD.